Patented May 24, 1949

2,470,750

UNITED STATES PATENT OFFICE 2,470,750

METHOD OF PREPARING GUM-CONTAINING SEEDS FOR DEHUSKING

Bernard Chiego, Newark, N. J.

No Drawing. Application June 16, 1944, Serial No. 540,745

2 Claims. (Cl. 146—235)

This invention relates to the problem of treating certain types of seeds or beans in a new and improved manner whereby a gum, used in the food and textile industries, may be obtained.

The gum obtained from the endosperms of the seeds of the carob tree (Ceratonia siliqua) and the seeds of Delonix regia (Poinciana regia Hook.) is a valuable commodity of commerce. Both of the seeds mentioned possess seed coats or husks which are very difficult to remove, and various methods have heretofore been employed therefor. Among the methods that have been used is the employment of concentrated sulfuric acid, 90–95% at a temperature of from 40° C. to 70° C. I have found that this method is slow and wasteful because the carbonizing process cannot be so controlled as to completely eliminate destructive action on portions of the endosperm. The seeds mentioned have an extremely hard husk or coat within which are carried the two symmetrical semi-transparent bodies, the endosperm, and within these are carried the embryo which includes the cotyledons. When treating carob beans by the concentrated sulfuric acid method, the husk or tegument is injured or partially destroyed, along with portions of the endosperm which contains the gum.

It is therefore the principal object of my invention to treat these beans so that the husk may be readily removed without the use of concentrated sulfuric acid.

Another object of my invention is the removal of such husk in a manner so as to obtain the endosperm and cotyledons comprising parts of the embryo both in an entirely and substantially unaltered state.

Further objects will occur to others skilled in this art from what follows.

In carrying out my improved process, I preferably treat the seeds in a vapor or liquid at super-atmospheric pressures and temperatures in the presence of an agent to control the swelling of the endosperms. Among such agents I may employ acids such as sulfurous acid, alcohols, (methyl or ethyl or propyl or isopropyl alcohol), acid salts such as the acid sulfates or acid sulfites of the alkalies. In addition, water soluble glycol ethers such as ethylene glycol mono alkyl ether or diethylene glycol mono alkyl ethers may be employed. I have found that perfect control of the swelling of the endosperms can be obtained by adding 5–15% of the alcohols or glycols to the water. In the case of the salts or acids much lower concentrations (1–2%) may be employed.

To accomplish my result, I prefer to employ dilute solutions of acid salts preferably reducing acid salts for example, sodium bisulfite in low concentrations at super-atmospheric pressures and temperatures.

Thus, in treating the seeds from Ceratonia siliqua, I employ a 1 or 2% solution of sodium bisulfite or sodium bisulfate in water. To this the beans are added and treated in a pressure vessel for from 5–30 minutes at 20–100 lbs. gauge steam pressure. The auto clave pressure is blown off and the beans are removed and washed in cold water, whereupon the hulls will be found to be easily removed from the endosperms which are in a slightly swollen but ungelatinized state. On passing these through squeeze-rollers or other suitable means, the cotyledons comprising parts of the embryo are pressed out entire from the endosperms and are recoverable. They have good food value. The endosperms are obtained by this method in an undiscolored, undegenerated whole state. On drying, they can be powdered to yield a superior product for commerce.

In treating the seeds of Delonix regia, I prefer to treat them at the same concentrations of acid salts or acid reducing salts but at slightly higher steam pressures because this seed has a double coat or hull. This is proven by the fact that when the seeds of Delonix regia are treated simply with steam at 20–100 lbs. pressure and a time interval of 1–8 minutes, the outer of the two hulls will be found to exfoliate from the inner hull which remains intact.

However, on treating these seeds with the above mentioned solutions at from 40–100 lbs. steam pressure and a time interval of from 2–8 minutes, the hulls are so altered as to make their removal easy by known methods. Again, the endosperm and inner cotyledons will be found to be substantially undiscolored, slightly swollen but ungelatinized and undegenerated.

In order to thoroughly explain my method of treatment, I cite the following examples of the steps which may be employed to prepare the pure gum by my method:

1. 100 lbs of seeds of Ceratonia siliqua are placed in a pressure auto clave. They are covered with a solution of 1 or 2% sodium bisulfite or sodium bisulfate or 5–15% of alcohols or water soluble glycol ethers. Heat is applied or steam is admitted for twenty minutes and the pressure maintained at 40 lbs. The pressure having been blown off, the seeds are washed in a suitable apparatus with cold water to remove the seed coats and then passed through squeeze-rollers to extrude the inner yellowish cotyledons. The endosperms are separated, dried and powdered.

2. 100 lbs. of seeds of *Delonix regia* are placed in a pressure auto clave and treated as above except at a higher pressure and temperature, viz. 20–30 minutes at 50–60 lbs. pressure. For the preparation of the finished product, one may proceed substantially as above.

I have found that the methods which I have used as heretofore explained are faster than any others of which I am aware, and easier to manipulate, cheaper to install and operate, and yield a superior product.

It is, of course, apparent that the concentration of agents for the control of the state of hydration of the endosperms as well as the time and pressure used in treatment may be altered considerably and over a wide range without departing from the scope of my invention. Thus, when the steam pressure is increased, the time of treatment may be decreased. Also when the concentration of agents for the control of hydration of the endosperm is increased, the time and pressure may be altered.

My process makes possible not only easier and cheaper treatment, but prepares the beans for dehusking in a manner that makes the complete removal of the inner cotyledons simple and efficient.

What I claim is:

1. The process of treating seeds having a tough outer coating or husk difficult of removal, over endosperms containing gum valuable in industry, which comprises treating the seeds to aid in removing the coating or husk, in an approximate 2% solution of water and sodium bisulfite in a pressure vessel under a steam pressure ranging from 20 to around 100 lbs. gauge for 5 to 30 minutes, the amount of said solution in the vessel being sufficient to substantially cover the seeds therein then after blowing off the pressure, washing the seeds and removing the husks, then removing the cotyledons and other parts of the embryo from the endosperms.

2. The process of treating seeds having a tough outer coating or husk difficult of removal, such as the seeds from the carob tree and the *Delonix regia* from their endosperms containing gum valuable in industry which consists in treating the seeds, to aid in removing the coating or husk, in an aqueous, approximately 2% solution of an acid reducing salt of the group consisting of bisulfites and bisulfates at super-atmospheric pressures and temperatures at a steam gauge pressure, ranging from 20 to 100 lbs. for from approximately 5 to 30 minutes which will soften the seed coat without effecting the state of hydration of the endosperms, then washing the seeds and removing the husks, then removing the cotyledons and other parts of the embryo from the endosperms.

BERNARD CHIEGO.

REFERENCES CITED

The following references are of record in the file of this patent:

UNITED STATES PATENTS

| Number | Name | Date |
| --- | --- | --- |
| Re. 8,615 | Fisher | Mar. 11, 1879 |
| 117,271 | Fitts | July 25, 1871 |
| 531,377 | Hanson | Dec. 25, 1894 |
| 566,497 | Castle | Aug. 25, 1896 |
| 580,401 | Hopkins | Apr. 13, 1897 |
| 641,934 | Castle | Jan. 23, 1900 |
| 853,940 | Zimmerman | May 14, 1907 |
| 1,051,582 | Heinemann | Jan. 28, 1913 |
| 1,087,684 | Reynolds | Feb. 17, 1914 |
| 1,433,928 | Baxter | Oct. 31, 1922 |
| 1,849,786 | Bloede | Mar. 15, 1932 |
| 1,987,304 | Menke | Jan. 8, 1935 |
| 2,007,693 | Ruter | July 9, 1935 |
| 2,059,787 | Gow | Nov. 3, 1936 |
| 2,128,175 | Baer | Aug. 23, 1938 |
| 2,326,868 | Lantz et al. | Aug. 17, 1943 |

OTHER REFERENCES

Handbook of Chemistry and Physics, by Hodgman-Holmes, 24th edition, published by Chemical Rubber Publishing Co., 1900 W. 112th St., Cleveland, Ohio, pages 436, 437, 462, 463, 464, 465, 494, and 495. Copy in Div. 25.